United States Patent [19]
Watai et al.

[11] Patent Number: 5,572,411
[45] Date of Patent: Nov. 5, 1996

[54] SURFACE LIGHT SOURCE DEVICE

[75] Inventors: Kayoko Watai, Hasuda; Tsuyoshi Ishikawa, Tokyo, both of Japan

[73] Assignee: Enplas Corporation, Saitama-ken, Japan

[21] Appl. No.: 362,446

[22] PCT Filed: May 6, 1994

[86] PCT No.: PCT/JP94/00743

§ 371 Date: Jan. 5, 1995

§ 102(e) Date: Jan. 5, 1995

[87] PCT Pub. No.: WO94/27171

PCT Pub. Date: Nov. 24, 1994

[30] Foreign Application Priority Data

May 7, 1993  [JP]  Japan ................. 5-028993 U

[51] Int. Cl.⁶ .................................................. F21V 7/04
[52] U.S. Cl. ................. 362/31; 362/29; 359/49; 359/50; 359/69
[58] Field of Search .................. 362/26, 31; 359/49, 359/50, 69

[56] References Cited

U.S. PATENT DOCUMENTS 4,791,540  12/1988  Dreyer et al. ................. 362/31
4,975,807  12/1990  Ohashi ........................ 362/26
5,408,388   4/1995  Kobayashi et al. ............ 362/31

FOREIGN PATENT DOCUMENTS 2-84618  3/1990  Japan.
5-33129  4/1993  Japan.

*Primary Examiner*—Carroll B. Dority
*Attorney, Agent, or Firm*—Finnegan, Henderson, Farabow, Garrett & Dunner

[57]  ABSTRACT

The present invention has its purpose to obtain a bright luminescent in a surface light source device using a light conducting member.

In the surface light source device according to the present invention, a light source is disposed in the vicinity of a light incident edge surface of the light conducting member, a light diffusing plate is arranged on the light emitting side of the light conducting member, and a prism sheet having a multiplicity of convex portions is provided on a side of the light diffusing member, which is opposite to the side where the light conducting member is arranged: and further each of the convex portion of the prism sheet is arranged such that the inclined angle on the light source side is smaller than the inclined angle on the opposite side thereof. Therefore, the luminescent light is directed to the portion to be illuminated of the liquid crystal display apparatus and thus a bright luminescent can be obtained.

8 Claims, 4 Drawing Sheets

SURFACE LIGHT SOURCE DEVICE

TECHNICAL FIELD

The present invention relates to a surface light source device for use in a back light system of a liquid crystal display apparatus.

BACKGROUND ART

FIG. 6 shows a construction of a liquid crystal display apparatus in which a conventional surface light source device using a light conducting member is used as its back light system. In FIG. 6, the numerical reference 1 represents a plate-like light conducting member, which is made of a transparent material, 2 a linear light source disposed in the vicinity of a light emitting edge surface 1a of said light conducting member 1, 3 a light diffusing plate disposed on a front surface 1b of said light conducting member 1 and the numerical reference 4 represents a light reflecting member arranged on a rear surface 1c of said light conducting member, constituting of the surface light source device. Further, the numerical reference 5 represents a liquid crystal display apparatus.

In the surface light source device, a light emitted from the light source 2 is made incident upon the light emitting surface 1a of the light conducting member 1 and then the light is introduced inside thereof. During when the light is transmitted to an opposite edge surface 1d of the light conducting member, the light is emitted from the front surface (light emitting surface) 1b of the light conducting member and then passes through the light diffusing plate 3 to become a diffused light. The liquid crystal display apparatus 5 is illuminated by the diffused light coming from the light diffusing plate 3.

The illuminating light generated from the surface light source device is diffused in all directions by the light diffusing plate 3, but the most of them is directed to a direction shown by arrows in FIG. 6. Therefore, there exists some light which is not made incident upon the liquid crystal display apparatus, and thus enough brightness cannot be obtained on the apparatus. Further, out of the light being made incident upon the liquid crystal display apparatus, only a few light is directed to a direction substantially perpendicular to the liquid crystal display apparatus, because of the existence of the light diffusion plate 3. Therefore, there is a drawback that the image surface of the liquid crystal display apparatus is dark for an operator who observes the image surface in front of the liquid crystal display apparatus.

In order to dissolve the drawback, it is considered that a prism sheet 11, on the surface of which a multiplicity of prism-like portions are formed, is disposed between the light diffusing plate 3 and the liquid crystal display apparatus 5, and thereby the diffusing light emitted from the light diffusing plate 3 is directed to a direction which is perpendicular to the surface of the liquid crystal display apparatus. However, an enough effect cannot be still obtained by using such prism sheet having the prism-like portions, which are formed thereon in a symmetrical manner.

Further, it is also considered that a light diffusing plate 3' having a strong light diffusing power is used as shown in FIG. 7. In such a device, the light coming through the light diffusing plate 3' is diffused into directions shown by the arrows in an enough manner, so that it can be prevented that the large amount of the diffusing light is directed into a perspective direction as shown in FIG. 6.

However, in this device, since the light diffusing function is strong, the light directed in a perpendicular direction with respect to the light diffusing plate is relatively decreased, too. Therefore, the problem cannot be improved that the brightness is not enough for the operator who observes the image surface in front of the liquid crystal display apparatus. In this case, even if the prism sheet 10 is arranged in the device, it is impossible to increase the brightness thereof.

The present invention has its object to provide a surface light source device using a light conducting member, particularly a surface light source device having a highly qualified brightness, by which an observation can be carried out on a bright image surface when the surface light source device according to the present invention is used as a back light system of a liquid crystal display apparatus.

DISCLOSURE OF THE INVENTION

A surface light source device according to the present invention comprises a light conducting member, a linear light source disposed in the vicinity of a light emitting edge surface of the light conducting member, a light diffusing member having a comparatively weak light diffusing power disposed on a front surface of the light conducting member, a light reflecting member disposed on a rear surface of the light conducting member, and a prism sheet disposed on one side of the light diffusing member which is opposite to the side on which the light conducting member is arranged; wherein the prism sheet comprises a multiplicity of prisms on a surface thereof, and each of prism has its cross section, which is in a direction perpendicular to both the light incident edge surface and the front surface of the light conducting member, such that an angle of the cross section on the light incident edge surface side is smaller than an angle on an opposite side thereof. By using the prism sheet having such a construction, the light diffused by the light diffusing member, which is directed in a perspective direction as a whole so as to be separated from the light source, is forced to change its direction into an upper direction. And thus, the brightness of the surface light source device becomes much higher.

It should be noted that unless the prism-like convex portions formed on the prism sheet are designed such that the angle on the light incident edge surface side is smaller than the angle on the opposite side thereof in the above mentioned cross section, any kind of shape of the prism sheet may be possible to use in the device according to the present invention and the same effect can be obtained.

BEST MODE FOR CARRYING OUT THE INVENTION

Figure 1:
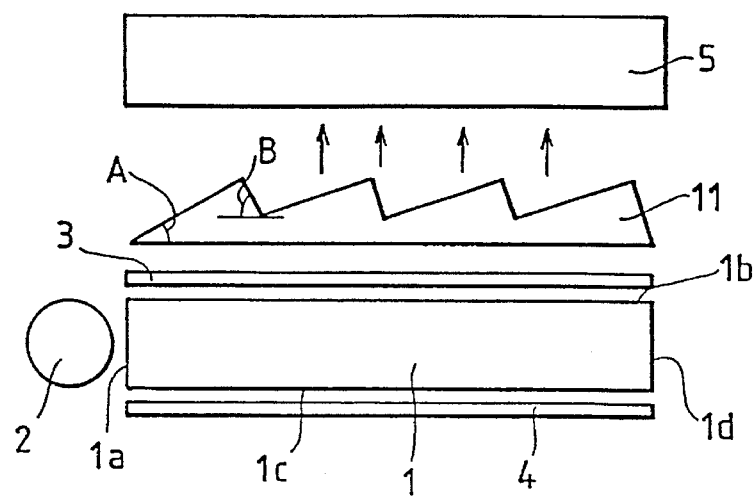
FIG. 1 is a cross-sectional view showing a construction of the first embodiment of the surface light source device according to the present invention.
Figure 2:
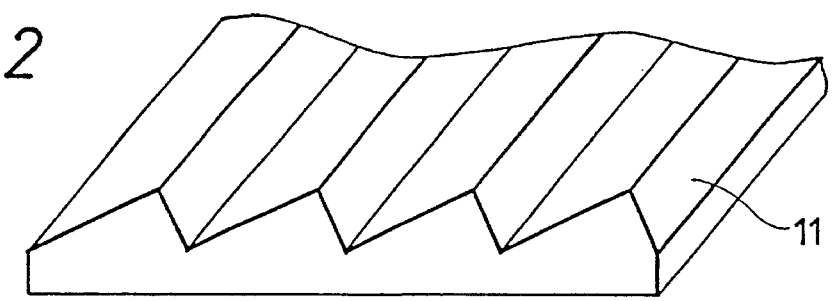
FIG. 2 is a perspective view depicting a construction of the prism sheet which is used in the first embodiment according to the present invention.

The embodiments of the surface light source device according to the present invention will be explained in the following. FIG. 1 is a cross-sectional view showing a liquid crystal display apparatus in which an embodiment of the surface light source device according to the present invention is used; and FIG. 2 is a perspective view illustrating a part of the prism sheet which is used in the first embodiment of the surface light source device. In these figures, the numerical reference 1 represents a light conducting member, 2 a linear light source, 3 a light diffusing plate, and the numerical reference 4 represents a light reflecting member. It should be noted that the surface light source device has the same construction as those of the devices shown in FIGS. 6 and 7. The numerical reference 5 denotes a liquid crystal display apparatus. In this embodiment, a prism sheet 11 having a construction which is different from the prism sheet 10 shown in FIG. 7 is disposed between the light diffusing plate 3 and the liquid crystal display apparatus 5. The prism sheet 11 has a saw-teeth like convex portions as shown in FIG. 2; that is to say, in a cross section thereof, which is cut in a direction perpendicular to both a light incident edge surface 1a and a front surface 1b of the light conducting member 1 (the cross section illustrated in FIG. 2, which is viewed from the direction shown by the arrow), there are provided a multiplicity of triangles in an orderly manner. It should be noted that the angles A and B of each triangle are arranged in such a manner that angle A on the light source side (a light incident edge surface side) is smaller than the angle B on the opposite side.

Figure 6:
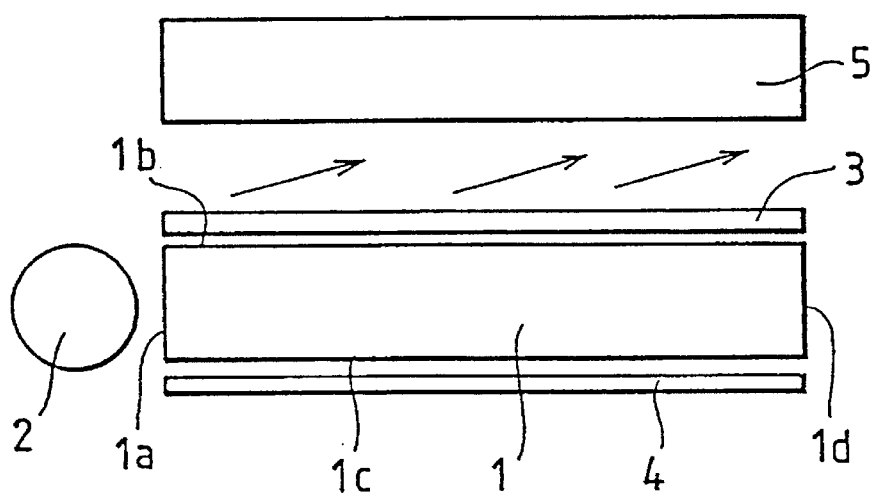
FIG. 6 is a cross-sectional view depicting a construction of the conventional surface light source device.
Figure 7:
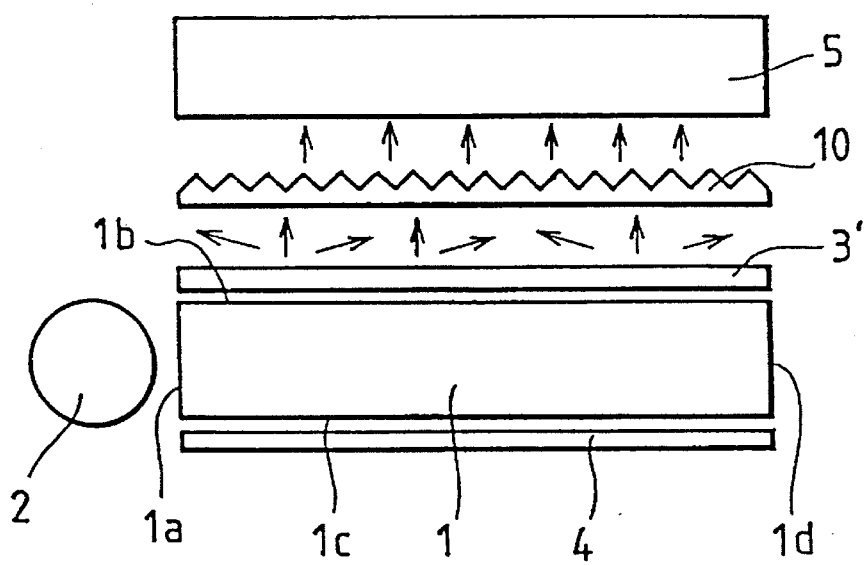
FIG. 7 is a cross sectional view illustrating a construction of another conventional surface light source device.

According to the embodiment, the diffusing light emitted from the light diffusing plate 3 as a whole is firstly directed to a direction as shown in FIG. 6, but the direction is changed to an upper direction by the function of prisms provided on the prism sheet. Then, the diffusing light is made incident upon the liquid crystal display apparatus 5. By the function of prisms, the most of the diffusing light is directed to a direction which is perpendicular or substantially perpendicular to the prism sheet, so that a bright back light system for the liquid crystal display apparatus, for instance, can be obtained.

Figure 3:
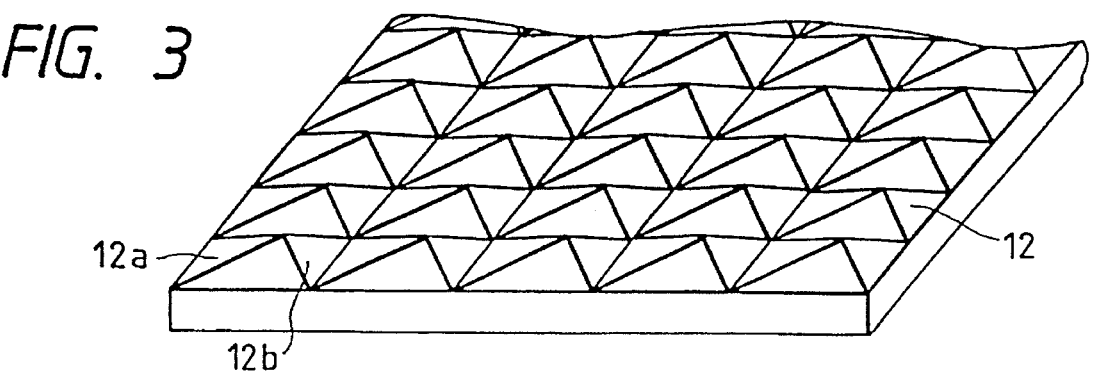
FIG. 3 is a perspective view illustrating a construction of the prism sheet which is used in the second embodiment according to the present invention.

FIG. 3 shows a construction of the second embodiment of the prism sheet. The prism sheet 12 comprises prisms each of which has a quadrangle pyramid shape, in which an inclined angle of a surface 12a, which is arranged on a light source side, is smaller than that of an opposite surface 12b. Such a construction, the prism sheet 12 comprising quadrangle pyramid shaped prisms gets the same function of the prism sheet 11, and thus the same effect can be obtained.

Figure 4:
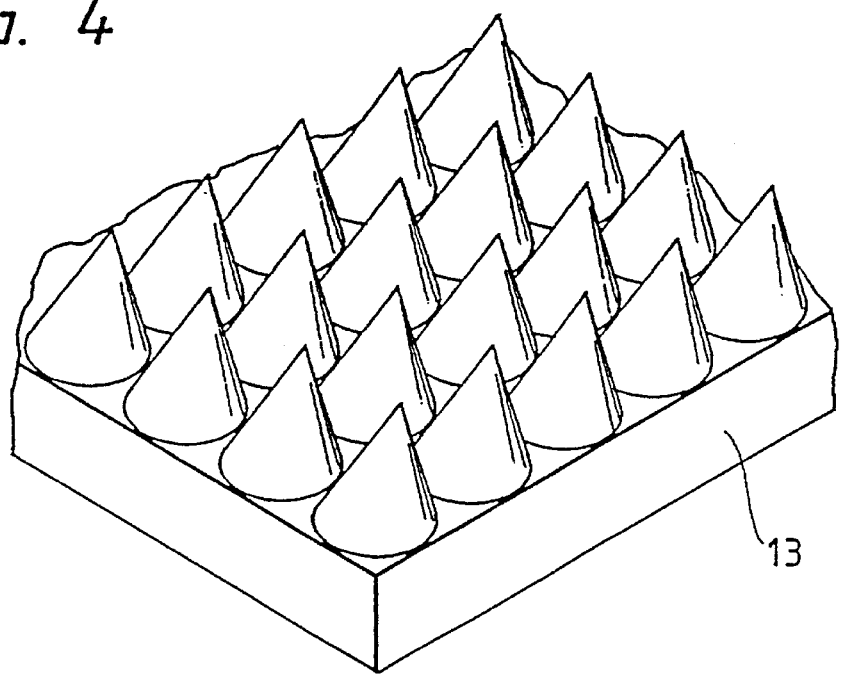
FIG. 4 is a perspective view representing a construction of the prism sheet which is used in the third embodiment according to the present invention.

FIG. 4 is a perspective view showing a construction of the third embodiment of the prism sheet 13. The prism sheet 13 comprises a multiplicity of conical shaped prisms, in which the top of each prisms is directed to an opposite side of the light source a little. Further, the prisms are arranged in such a manner that an angle corresponding to the angle A of the prism sheet of the second embodiment, which is shown in FIG. 2, is smaller than an angle corresponding to the angle B of the prism sheet of the second embodiment.

Figure 5:
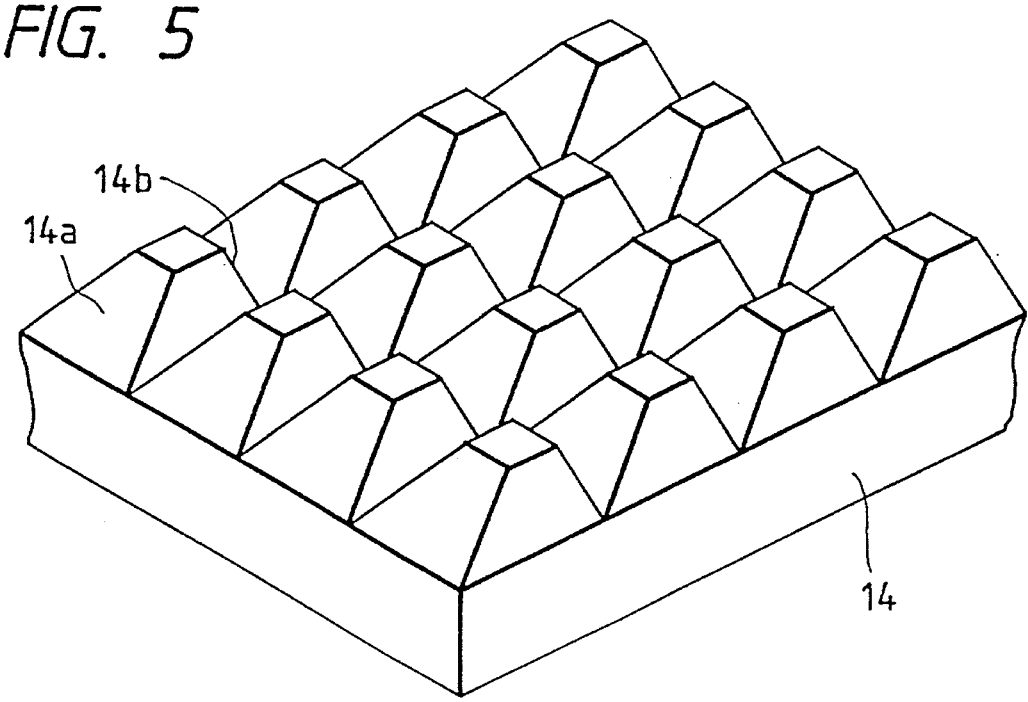
FIG. 5 is a perspective view showing a construction of the prism sheet which is used in the fourth embodiment according to the present invention.

FIG. 5 is a perspective view representing the prism sheet used in the third embodiment of the surface light source device. The prism sheet 14 comprises a multiplicity of prisms each having a quadrangle pyramid shape but without its top portion. Therefore, each of the prism has a trapezoid-like cross section. Further, the inclined angle of the inclined surface 14a of the prism is arranged to be smaller than the inclined angle of the inclined surface 14b, and thus the prism sheet has the same function and effect as those of the prism sheet of the second embodiment.

Figure 8:
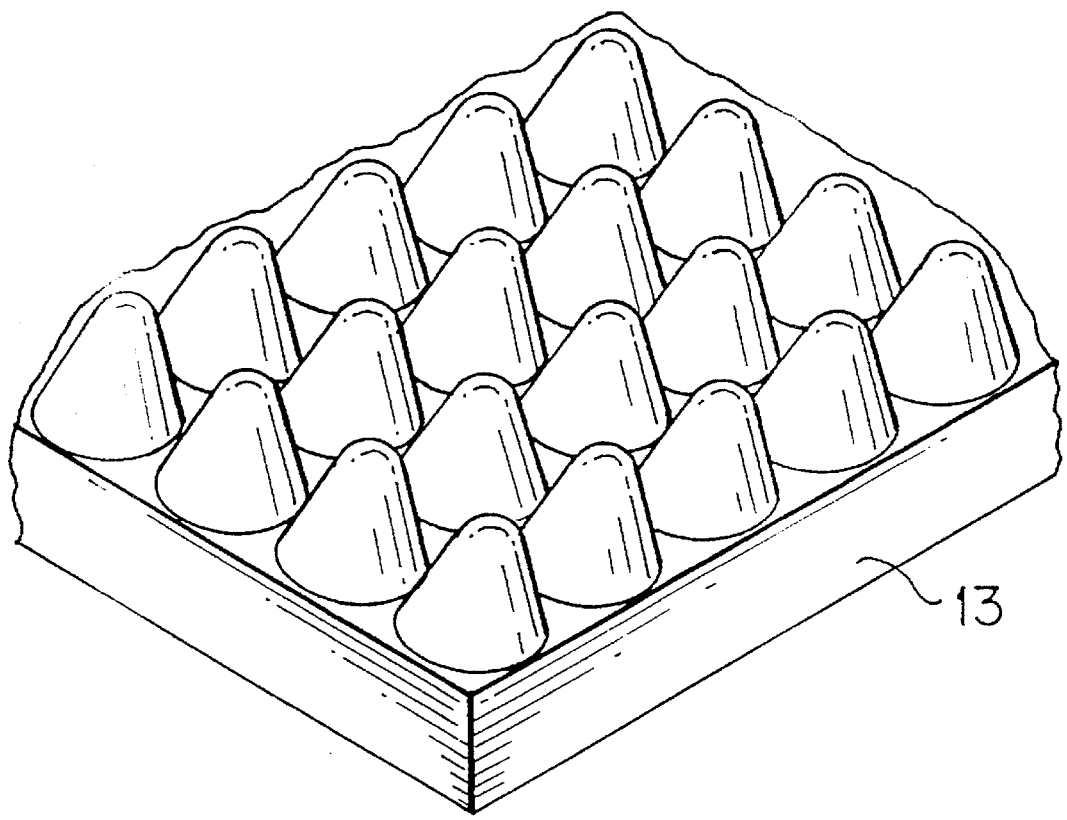
FIG. 8 is a perspective view representing a construction of the prism sheet which is used in yet another embodiment according to the present invention.

In the embodiments mentioned in the above, typical shapes of the convex portions (prism portions) formed on the prism sheet are shown. However, the prism sheets may have some shapes other than the above-mentioned embodiments (prism sheets may have prisms having the shapes other than those of the embodiments, including the prisms whose corner portions, i.e. apical angle portions or edge portions thereof, are rounded off), and the prism sheets have the same function and effect as those of the above-mentioned embodiments, if only the prisms formed on the prism sheet are arranged such that the angle on the light source side is smaller than the angle on the opposite side. FIG. 8 illustrates one of the above-mentioned shapes, i.e., one in which the apical angle is rounded off.

It is desired that the angle A is less than 45° degrees and the angle B is between 35° to 60° degrees. That is to say, the angles A and B are desired to satisfy the following conditions.

$A \leq 45°$ $35° \leq B \leq 60°$ $A < B$

In the above mentioned embodiments, the surface light source device comprising only one linear light source is shown. However, the present invention can be applied to the surface light source device having two or more linear light sources. For instance, the present invention may be applied to the surface light source device having two linear light sources which is obtained by adding one more linear light source on the edge surface 1d side of the light conducting member of the device shown in FIG. 1. In this case, the prism sheet should have its construction such that the prisms formed on the edge surface 1d side of the prism sheet are arranged to be inclined in a direction, which is reversed to the direction in which the prisms formed on the edge surface 1a side of the prism sheet are inclined. (This means in the edge surface 1d side of the prism sheet the smaller angle A should be arranged on the edge surface 1d side and the larger angle B on the edge surface 1a side); and thus the direction of the prisms should be changed at the center of the prism sheet, i.e. between the edge surface 1a and the edge surface 1d. Irrespective of the number of light sources provided in the device, it may be possible to arrange a plurality of piled-up prism sheets in the device. In this case, the prism sheets piled in an upper side from the second one may be possible to be designed such that the inclined angles of the prisms formed on the edge surface 1a side and the edge surface 1d side are the same.

INDUSTRIAL APPLICABILITY

In the surface light source device according to the present invention, the prism sheet having special shaped prisms is arranged on the surface of the light diffusing plate so that the most of the light emitted from the prism sheet is directed to a direction perpendicular or substantially perpendicular to the surface of the prism sheet. Therefore, when the surface light source device according to the present invention is used, for instance, as a back light system of the liquid crystal display apparatus, a bright light source can be obtained.

We claim:

1. A surface light source device comprising a light conducting member; a linear light source being disposed in the vicinity of at least one of light emitting edge surfaces of said light conducting member; a light diffusing member being disposed on a front surface side of said light conducting member; a light reflecting member being disposed on a rear surface of said light conducting member; and a prism sheet being disposed on one side of said light diffusing member, which is opposite to the side where the light conducting member is arranged, and having a multiplicity of prism-like convex portions on at least one of surfaces of the prism sheet; wherein each convex portion of said prism sheet is arranged such that an inclined angle on a light source side is smaller than an inclined angle on an opposite side thereof in a cross-section of the prism sheet which is cut in a direction perpendicular to both an light incident edge surface and a front surface of said light conducting member.

2. A surface light source device according to claim 1, wherein said light source is arranged only one of the edge side surfaces of the light conducting member.

3. A surface light source device according to claim 2, wherein said surface light source device satisfies the following conditions:

$A \leq 45°$ $35° \leq B \leq 60°$ $A < B$ wherein the reference symbol A represents an angle at a light source side of said convex portion of the prism sheet, and the reference symbol B denotes an angle at an opposite side of the light source side of said convex portion.

4. A surface light source device according to claim 1, 2 or 3, wherein the convex portions of said prism sheet form a saw-teeth like shape cross section, when the prism sheet is cut in a direction perpendicular to both the light emitting edge surface and the front surface of the light conducting member; and the saw-teeth like convex portions are extended in a perpendicular direction with respect to the cross section.

5. A surface light source device according to claim 1, 2 or 3, wherein each of the convex portion of said prism sheet has a quadrangle pyramid shape.

6. A surface light source device according to claim 1, 2 or 3, wherein each of the convex portion of said prism sheet has a conical shape.

7. A surface light source device according to claim 1, 2, or 3, wherein each of the convex portions of said prism sheet has a quadrangle pyramid shape without its top portion and thus has its cross section of trapezoid.

8. A surface light source device according to claim 1, 2 or 3, wherein each of the convex portion of the prism sheet has a conical or polygonal pyramid shape with a rounded top portion.

* * * * *